US006413569B1

(12) United States Patent
Borders et al.

(10) Patent No.: US 6,413,569 B1
(45) Date of Patent: Jul. 2, 2002

(54) USE OF ISOLATED SOY PROTEIN FOR MAKING FRESH, UNRIPENED CHEESE ANALOGS

(75) Inventors: Cheryl Borders, Moweaqua; Victor Lobo; Russ Egbert, both of Decatur, all of IL (US); Lewis True, Indianapolis, IN (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 09/408,074

(22) Filed: Sep. 29, 1999

(51) Int. Cl.$^7$ ................................................ A23C 20/00
(52) U.S. Cl. ........................ 426/582; 426/656; 426/580
(58) Field of Search ........................... 426/36, 40, 580, 426/582, 656

(56) References Cited

U.S. PATENT DOCUMENTS

| | | | |
|---|---|---|---|
| 2,604,405 A | * 7/1952 | Petersen ...................... | 426/582 |
| 3,806,606 A | * 4/1974 | Seiden ................... | 426/250 X |
| 3,941,891 A | * 3/1976 | Kasik et al. ............. | 426/582 X |
| 4,080,477 A | 3/1978 | Tsumura et al. ............ | 426/656 |
| 4,172,828 A | * 10/1979 | Davidson et al. ........ | 426/656 X |
| 4,197,322 A | * 4/1980 | Middleton .............. | 426/582 X |
| 4,346,122 A | * 8/1982 | Orthoefer et al. ........... | 426/656 |
| 4,349,576 A | * 9/1982 | Lehnhardt et al. ....... | 426/656 X |
| 4,397,926 A | * 8/1983 | Galal et al. .................. | 426/582 |
| 4,435,438 A | * 3/1984 | Lehnhardt et al. .......... | 426/656 |
| 4,486,343 A | * 12/1984 | Walker et al. ........... | 426/656 X |
| 4,497,834 A | * 2/1985 | Barta ...................... | 426/582 X |
| 4,556,569 A | * 12/1985 | Brander et al. ......... | 426/582 X |
| 4,608,265 A | * 8/1986 | Zwiercan et al. ........... | 426/582 |
| 4,678,676 A | * 7/1987 | Ishizuka et al. ........ | 426/582 X |
| 4,684,533 A | * 8/1987 | Kratochvil ............... | 426/582 X |
| 4,937,091 A | * 6/1990 | Zalle et al. .................. | 426/582 |
| 5,061,504 A | * 10/1991 | Kong-Chan et al. ........ | 426/582 |
| 5,064,660 A | * 11/1991 | Silver ..................... | 426/582 X |
| 5,807,601 A | * 9/1998 | Carpenter et al. ....... | 426/582 X |
| 5,902,625 A | * 5/1999 | Barz et al. .................. | 426/582 |
| 5,935,634 A | * 8/1999 | Gamay et al. .............. | 426/582 |
| 6,093,424 A | 7/2000 | Han et al. ..................... | 426/42 |
| 6,107,468 A | * 8/2000 | Boatright .................... | 530/378 |

FOREIGN PATENT DOCUMENTS

| EP | EP 0 815 736 A1 | 1/1998 |
|---|---|---|
| WO | 01/22829 | 4/2001 |
| WO | 01/22830 | 4/2001 |

OTHER PUBLICATIONS

Kosikowski, F.V. and Mistry, V.V., "Biology of A Ripening Cheese," *Cheese and Fermented Milk Foods*, 3$^{rd}$ edn., pp. 386–421 (1997).

Kosikowski, F.V. and Mistry, V.V., "Appendix," *Cheese and Fermented Milk Foods*, 3$^{rd}$ edn., pp. 698 (1997).

Smith et al., Soybeans: Chemistry and Technology Volume 1 Proteins, The AVI Publishing Company, Inc., Westport, Ct 1972, pp. 319–321.*

Del Valle, F. R. et al., "Simultaneous Curdling of Soy/Cow's Milk Blends with Rennet and Calcium or Magnesium Sulfate, Utilizing Soymilk Prepared from Soybeans or Full–Fat Soy Flour, " J. Food Sci. 49:1046–1052, Instutute of Food Technologist (1984).

English Language translation for Russian Patent Publication No. SU 1205870 A.

English language abstract for Russian Patent Publication No. SU 1205870 A, Derwent World Patnets Index Accession No. 1986–224540.

Pending Non–Provisional United States Patent Application No. 09/408,075, Gottemoller et al., filed Sep. 29, 1999.

Pending Non–Provisional United States Patent Application No. 09/693,952, Gottemoller et al., filed Oct. 23, 2000.

Pending Non–Provisional United States Patent Application No. 09/674,711, Borders et al., filed Nov. 30, 2000.

Fox, P.F., In Cheese: chemistry, Physics and Microbiology, Ch. 7.1.2, chapman & Hall, P. 396 (1993).

English language abstract for Smietana, Z., "Study of guided modification of milk proteins for processing purposes," Zeszyty Naukowe Akademil Rolniczo Technicznej W Olsztyniem Technologia Zywnosci 14:123–184, Inst. Inzynierii & Biotech. Zywnosci (1979). FSTA/IFIS Accession No. 80–2–11–pl1849.

English language abstract for Venkatachalam, N., et al., "Effect fo soy protein isolate on rennet coagulation of milk and microstructure of chesse curd," IFT Annual Meeting 1995, Dept. Nutr. & Food Sci.m Utah State Univ., Logan UT, p. 134 (1995). FST/IFIS Accession No. 95–1–11–p0051.

English language abstract for Japanese Patent Publication No. JP 59–0475858, Derwent World Patents Index Accession No. 1979–725048.

English language abstract for Russian Patent Publication No. SU 1 785 421 A3, Derwent World Patents Index Accession No. 1994–031781.

* cited by examiner

*Primary Examiner*—Milton Cano
(74) *Attorney, Agent, or Firm*—Sterne, Kessler, Goldstein & Fox P.L.L.C.

(57) ABSTRACT

The present invention relates, in general, to a method for making a fresh, unripened cheese analog. The invention also relates to fresh, unripened cheese analog.

18 Claims, No Drawings

USE OF ISOLATED SOY PROTEIN FOR MAKING FRESH, UNRIPENED CHEESE ANALOGS

BACKGROUND OF THE INVENTION

1. Field of the Invention

The present invention relates, in general, to a method for making a fresh, unripened cheese analog by incorporating isolated soy protein. The invention also relates to fresh, unripened cheese analog.

2. Background Information

While the art of cheesemaking has been practiced for centuries, the cheesemaker is always looking for ways to improve the finished cheese yield obtained from the starting quantity of milk. This becomes very important in areas of the world where the milk supply is limited. Attempts have been made over the years to incorporate soy protein as an economic replacement for milk proteins. Problems can be encountered due to differences between milk and soy proteins in molecular and functional properties which can affect the quality of the finished cheese.

Therefore, a method is provided which incorporates isolated soy protein into a coagulated milk matrix.

SUMMARY OF THE INVENTION

The invention provides a method for making a fresh, unripened cheese analog comprising, (a) mixing isolated soy protein and milk; (b) coagulating the mixture in (a); (c) cutting the product resulting from (b); (d) agitating the product resulting from (c) for about 40 to about 60 minutes at a temperature selected from the range of about 30° C. to about 50° C.; (e) separating about 50 to about 80% of whey from product resulting from (d); and (f) placing product resulting from (d) in molds and placing molds at a temperature of at least about 28° C. for about 2 to about 8 hours.

DETAILED DESCRIPTION OF THE INVENTION

The invention provides a method for making a fresh, unripened cheese analog comprising, (a) mixing isolated soy protein and milk; (b) coagulating the mixture in (a); (c) cutting the product resulting from (b); (d) agitating the product resulting from (c) for about 40 to about 60 minutes at a temperature selected from the range of about 30° C. to about 50° C.; (e) separating about 50 to about 80% of whey from product resulting from (d); and (f) placing product resulting from (d) in molds and placing molds at a temperature of at least about 28° C. for about 2 to about 8 hours.

The milk used in the present invention may be present in amounts of from about 95% to about 99%, and preferably from about 98% to about 99%. The milk may comprise of from about 0% to about 10% fat and preferably from about 0.5% to about 5% fat. It may be desirable to use milk with a low fat content and optionally add fat from other sources. As such, the fat contained in the milk may originate from at least one of the compounds of the group comprising milkfat or vegetable oil.

The invention provides the above and below described methods wherein said soy protein is present in amounts of from about 10% to 100% by weight, and preferably from about 15% to about 50%. By "percent" it is meant weight percent based on the calculated amount of casein solids in the milk. The isolated soy protein used in the present invention may be prepared by pH adjusting soy curd prior to spray drying or by blending different isolated soy proteins to obtain the desired pH. The pH of the isolated soy protein(s) may be of from about 3 to about 7, and preferably of from about 4.5 to about 6.0.

In one embodiment, the present invention provides a method of making a cheese analog by adding at least one compound to a mixture of isolated soy protein and milk, wherein said compound is selected from the group comprising transglutaminase, starch, a whitening agent, hydrocolloid gum, calcium chloride, and a coagulating enzyme.

Transglutaminase is an enzyme which crosslinks proteins and which aids in crosslinking the isolated soy protein and milk proteins. The transglutaminase catalyzed crosslinks serve to compatibilize the soy and milk proteins. These crosslinks help in improving the functionality of the different proteins and therefore improving the texture of the finished product. Transglutaminase is preferably present in amounts from about 0% to about 1.0%, and preferably from about 0% to about 0.2%.

As a binder or filler in the cheese, generally any starch which is at least partially soluble in water at the described temperatures can be employed in the cheese analog making method of the present invention. Corn and potato starches are types of binder that may be used. The preferred starch should be pregelatinized by mixing with water and heating to its gelatinization temperature prior to addition to the milk. The gelatinized starch may optionally be added in amounts of from about 0% to about 20%, and preferably from about 0% to about 10%.

Often it is desirable to produce a cheese analog with a white appearance. As such, the present invention provides for the optional addition of a whitening agent in amounts of from about 0% to about 0.5%, preferably from about 0% to about 0.1%. The whitening agent must be chemically inert and harmless to the animal or human who ingests the agent, but, of course also must make the appearance of the cheese white. The invention provides the herein described methods wherein said whitening agent may be selected from the group comprising titanium dioxide, benzoyl peroxide, or green and blue food colorings.

A hydrocolloid gum may be optionally added as a stabilizer to improve the yield of the cheese, and may be added in amounts of from about 0% to about 2%, and preferably from about 0% to about 0.8%. The hydrocolloid gum can be selected from the group comprising carrageenan, carob bean, guar and xanthan.

The invention provides a method for producing a soft, sliceable, unripened cheese-like product. Firming agents may optionally be added to firm the curd. Preferably, calcium chloride is added to produce a firm cheese curd and can be added in amounts of from about 0% to about 0.5%, preferably from about 0% to about 0.2%.

Following step (a), above, a coagulating enzyme may be used to speed the coagulation process, and may be added in catalytic amounts. The coagulating enzyme may be selected from the group comprising rennet and its synthetic equivalents. Preferred rennet preparations can be selected from the group comprising AmericanPure, (SBI-Systems Bio-Industries, calf rennet purified via ion-exchange), Chy-Max (Pfizer, fermentation—using *Escherichia coli* K-12), Chymogen (Chris Hansen, fermentation—using *Aspergillus niger* var. awamori), ChymoStar (Rhône-Poulenc, fermentation—using *Aspergillus niger* var. awamori), Maxiren (Gist-Brocades, Fermentation—using *Kluyveromyces marxianus* var. lactis), Novoren (Marzyme GM) (Novo Nordisk, Fermentation—using *Aspergillus oryzae*). Kosikowski, F. V. and Mistry, V. V. (1997), "Cheese and Fermented Milk Foods," 3rd edn., F. V. Kosikowski, L. L. C., Westport, Conn., pp. 395 and 698.

A mixture comprising curds and whey results after step (d), above. The whey may be separated from the remainder of the above and below described mixtures by at least one of the methods selected from the group comprising draining, straining and filtering. Preferably, said separating results in elimination of from about 50% to 80% of the whey, and even more preferably, results in elimination of from about 60 to 70% of the whey.

After separating a percentage of the whey from the rest of the above described mixtures, the mixture is salted to improve flavor and texture. The salting agent can be selected from the group comprising sodium chloride. The salted mixture is poured into molds to shape the cheese. The mixture in the molds may also optionally be externally pressed to remove more moisture from the cheese analog. The resulting cheese composition after step (f) comprises from about 2% to about 17% soy isolate.

The present invention is described in further detail in the following non-limiting examples.

EXAMPLES

Example 1

Isolated soy protein was prepared by pH adjusting soy curd prior to spray drying. The pH of the isolated soy protein ranged from between 4.5 to 6.0. 2650 grams of milk were placed in a vat. Twenty eight grams of isolated soy protein was incorporated into 300 grams of milk with high shear agitation or the use of a homogenizer. The isolated soy protein/milk mixture was added when the milk in the vat reached a temperature of 32° C. Six grams of calcium chloride was dissolved in water then added to the mixture in the vat, followed by the synthetic rennet. The milk/soy protein matrix was then allowed to coagulate for a period of 40 minutes. The curd was then cut using cheese knives and allowed to "heal" for 5 minutes. The cut curds were then agitated occasionally for about 40 minutes and allowed to cook at a temperature of 37° C. Approximately 60–70% of the whey was drained and 3.5% salt was incorporated, based on the weight of the remaining whey and curds. The salted whey/curd mixture was poured into molds and allowed to set for 4 hours, without external pressing, at a minimum temperature of 28° C. After four hours, the molds were placed in refrigerated storage overnight. The finished cheese was removed from the mold and packaged. The weight of the finished cheese product was increased by 3 to 12.5% compared to the product produced without the addition of isolated soy protein.

Example 2

Isolated soy protein was prepared by blending different isolated soy proteins to obtain the desired pH. The pH of the isolated soy protein ranged from 4.5 to 6.0. 2650 grams of milk were placed in a vat. Twenty-eight grams of an isolated soy protein blend and 6 grams of a 50% titanium dioxide dispersion were incorporated into 300 grams of milk with high shear agitation or the use of a homogenizer. The isolated soy protein/milk/titanium dioxide mixture was added when the milk in the vat reached a temperature of 32° C. Six grams of calcium chloride was dissolved in water then added to the mixture in the vat, followed by the synthetic rennet. The milk/soy protein matrix was then allowed to coagulate for a period of 40 minutes. The curd was then cut using cheese knives and allowed to "heal" for 5 minutes. The cut curds were then agitated occasionally for about 40 minutes and allowed to cook at a temperature of 37° C. Approximately 60–70% of the whey was drained and 3.5% salt was incorporated, based on the weight of the remaining whey and curds. The salted whey/curd mixture was poured into molds and allowed to set for 4 hours, without external pressing, at a minimum temperature of 28° C. After four hours, the molds were placed in refrigerated storage overnight. The finished cheese was removed from the mold and packaged. The weight of the finished cheese product was increased by 9 to 14% compared to the product produced without the addition of isolated soy protein.

Example 3

Isolated soy protein was prepared by either adjusting the soy curd prior to spray drying or by blending different isolated soy proteins to obtain the desired pH. The pH of the isolated soy protein or isolated soy protein blends ranged from 4.5 to 6.0. 2650 grams of milk were placed in a vat. Twenty-eight grams of the isolated soy protein or isolated soy protein blend; 6 grams of a 50% titanium dioxide dispersion; and 1 activity unit of transglutaminase were incorporated into 300 grams of milk with high shear agitation or the use of a homogenizer. The isolated soy protein/milk/titanium dioxide/transglutaminase mixture was added when the milk in the vat reached a temperature of 32° C. Six grams of calcium chloride was dissolved in water then added to the mixture in the vat, followed by the synthetic rennet. The milk/soy protein matrix was then allowed to coagulate for a period of 40 minutes. The curd was then cut using cheese knives and allowed to "heal" for 5 minutes. The cut curds were then agitated occasionally for about 40 minutes and allowed to cook at a temperature of 37° C. Approximately 60–70% of the whey was drained and 3.5% salt was incorporated, based on the weight of the remaining whey and curds. The salted whey/curd mixture was poured into molds and allowed to set for 4 hours, without external pressing, at a minimum temperature of 28° C. After four hours, the molds were placed in refrigerated storage overnight. The finished cheese was removed from the mold and packaged. The weight of the finished cheese product was increased by 16.5 to 23% compared to the product produced without the addition of transglutaminase and isolated soy protein.

All publications mentioned hereinabove are hereby incorporated in their entirety by reference.

While the foregoing invention has been described in some detail for purposes of clarity and understanding, it will be appreciated by one skilled in the art from a reading of this disclosure that various changes in form and detail can be made without departing from the true scope of the invention and appended claims.

What is claimed is:

1. A method for making a fresh, unripened cheese analog comprising
   (a) mixing isolated soy protein and milk wherein said isolated soy protein has a pH from about 3 and 7;
   (b) adding a coagulating agent to said mixture from (a);
   (c) cutting product resulting from (b);
   (d) agitating the product resulting from (c) for about 0 to about 90 minutes at a temperature of from about 30° C. to about 50° C.;
   (e) separating about 50 to about 80% of whey from product resulting from (d) and salting; and (f) placing product resulting from (e) in molds and placing molds at a temperature of at least about 28° C. for about 2 to about 8 hours;

(g) subjecting the molded product from (f) to external pressure.

2. The method of claim 1, wherein said milk is present in amounts of from about 95% to about 99%.

3. The method of claim 1, wherein said milk from step (a) comprises 0% to 10% fat.

4. The method of claim 3, wherein said fat comprises milk fat or vegetable oil.

5. The method of claim 1, wherein said soy protein is present in amounts from about 10% to about 100% by weight.

6. The method of claim 1, wherein said isolated soy protein from step (a) has a pH of from about 3 to about 7.

7. The method of claim 1, wherein following said step (a), at least one compound selected from the group comprising transglutaminase, starch, whitening agent, hydrocolloid gum, and a firming agent is added to the mixture.

8. The method of claim 7, wherein said transglutaminase is present in amounts from about 0% to about 1%.

9. The method of claim 7, wherein said starch is present in amounts of from about 0% to about 20%.

10. The method of claim 7, wherein said whitening agent is selected from the group comprising titanium dioxide, benzoyl peroxide, green food coloring and blue food coloring.

11. The method of claim 7, wherein said whitening agent is present in amounts of from about 0% to about 0.5%.

12. The method of claim 7, wherein said hydrocolloid gum is selected from the group comprising carrageenan, carob bean, guar gum and xanthan gum.

13. The method of claim 7, wherein said hydrocolloid gum is present in amounts from about 0% to about 2%.

14. The method of claim 7, wherein said firming agent is calcium chloride.

15. The method of claim 7, wherein said firming agent is present in amounts of from about 0% to about 0.5%.

16. The method of claim 1, wherein said coagulating agent comprises rennet or a synthetic rennet equivalent.

17. The method of claim 1, wherein about 2 to about 10% salt is added to said product following step (d).

18. The method of claim 1, wherein during step (f), the mixture is subjected to external pressure.

* * * * *